(12) United States Patent
Viaud et al.

(10) Patent No.: US 6,293,894 B2
(45) Date of Patent: *Sep. 25, 2001

(54) ROLL FOR ROUND BALER

(75) Inventors: Jean Viaud, Sarreguemines (FR); David C. Preece, Nottingham (GB)

(73) Assignee: Deere & Company, Moline, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,428

(22) Filed: Jan. 15, 1999

(30) Foreign Application Priority Data

Jan. 16, 1998 (DE) .................. 198 01 528

(51) Int. Cl.$^7$ ............................... F16C 13/00
(52) U.S. Cl. ................................... 492/47
(58) Field of Search ........... 492/47, 48; 100/89, 100/162 B, 88

(56) References Cited

U.S. PATENT DOCUMENTS

| | | | |
|---|---|---|---|
| 2,152,076 | * | 3/1939 | Menough ............... 492/47 |
| 2,513,515 | * | 7/1950 | Powers .................. 492/47 |
| 2,988,803 | * | 6/1961 | Mohn ..................... 492/47 |
| 3,037,756 | * | 6/1962 | Ornitz ................... 492/47 |
| 4,229,950 | * | 10/1980 | Fessenden ............ 464/184 |
| 4,607,420 | * | 8/1986 | Vomhoff ................ 492/5 |
| 4,635,543 | | 1/1987 | Clostermeyer et al. . |
| 4,638,623 | | 1/1987 | Schaible et al. . |
| 5,193,450 | | 3/1993 | Anderson . |
| 5,195,402 | | 3/1993 | McMillen et al. . |
| 5,279,535 | * | 1/1994 | Mawes et al. ......... 492/47 |
| 5,411,462 | * | 5/1995 | Link ...................... 492/30 |
| 5,613,931 | * | 3/1997 | Maty ..................... 492/47 |

* cited by examiner

*Primary Examiner*—S. Thomas Hughes
*Assistant Examiner*—Marc W Butler

(57) ABSTRACT

A roll for use in defining a baling chamber of a large round baler includes a tubular central body having stub shafts projecting from opposite ends thereof and secured thereto at locations within opposite ends of the tubular body. In one embodiment, a flange is formed integrally with each stub shaft and is welded to a tubular cylindrical extension inserted into a respective end of the tubular central body and secured there either by a press fit and/or welding. In a second embodiment, a flange is integral with each tubular extension as well as with each stub shaft with the flanges of the stub shafts being respectively bolted to the flanges of the extensions.

7 Claims, 3 Drawing Sheets

ROLL FOR ROUND BALER

BACKGROUND OF THE INVENTION

This invention pertains to a roll for a round baler and more specifically relates to a roll such as that used for defining the boundary of the baling chamber of such a baler.

Conventional rolls for round balers include a central body defined by a steel tube that is usually profiled and extends over a length of 1.2 to 1.5 meters. In order to realize a rotatable support, the tube is carried either by a shaft extending axially through, or stub shafts extending from opposite ends of, the tube, with flanges defined by circular steel plates being mounted between the shaft or stub shafts and the tube. Examples of these structures are shown in U.S. Pat. No. 4,635,543 granted to Clostermeyer et al. on Jan. 13, 1987; U.S. Pat. No. 4,638,623 granted to Schaible et al. on Jan. 27, 1987; U.S. Pat. No. 5,195,402 granted to McMillen et al. on Mar. 23, 1993; and U.S. Pat. No. 5,193,450 granted to Anderson on Mar. 16, 1993.

The prior art designs have one or more of the drawbacks of being relatively costly and/or difficult to manufacture, of being difficult to maintain and of resulting in stress cracks forming at the welded joint between the flanges and the tubular central body.

SUMMARY OF THE INVENTION

According to the present invention, there is provided an improved roll for a round baler and more specifically, there is provided an improved structure for joining stub shafts to the opposite ends of a metal tube forming tubular central body of the roll.

An object of the invention is to provide a roll for a round baler including a stub shaft assembly which is relatively inexpensive to manufacture and is easy to maintain while resulting in strong, reliable connection between the stub shaft and the tubular central body. In a first embodiment of the invention, this object is achieved by forming the stub shaft integrally with a circular flange and welding this flange to one end of a tubular cylindrical extension which is inserted into the end of the tubular central body and held in place either by a shrink fit and/or by welding at a series of holes provided in the tube. In a second embodiment of the invention, the object is achieved by forming both the stub shaft and the tubular cylindrical extension integral with a respective circular flange, and bolting these flanges together, the extension being inserted into the end of the tube and held in place like the extension in the first embodiment.

These and other objects will become apparent from a reading of the ensuing description together with the appended drawings.

DESCRIPTION OF THE PREFERRED EMBODIMENT

Figure 1:
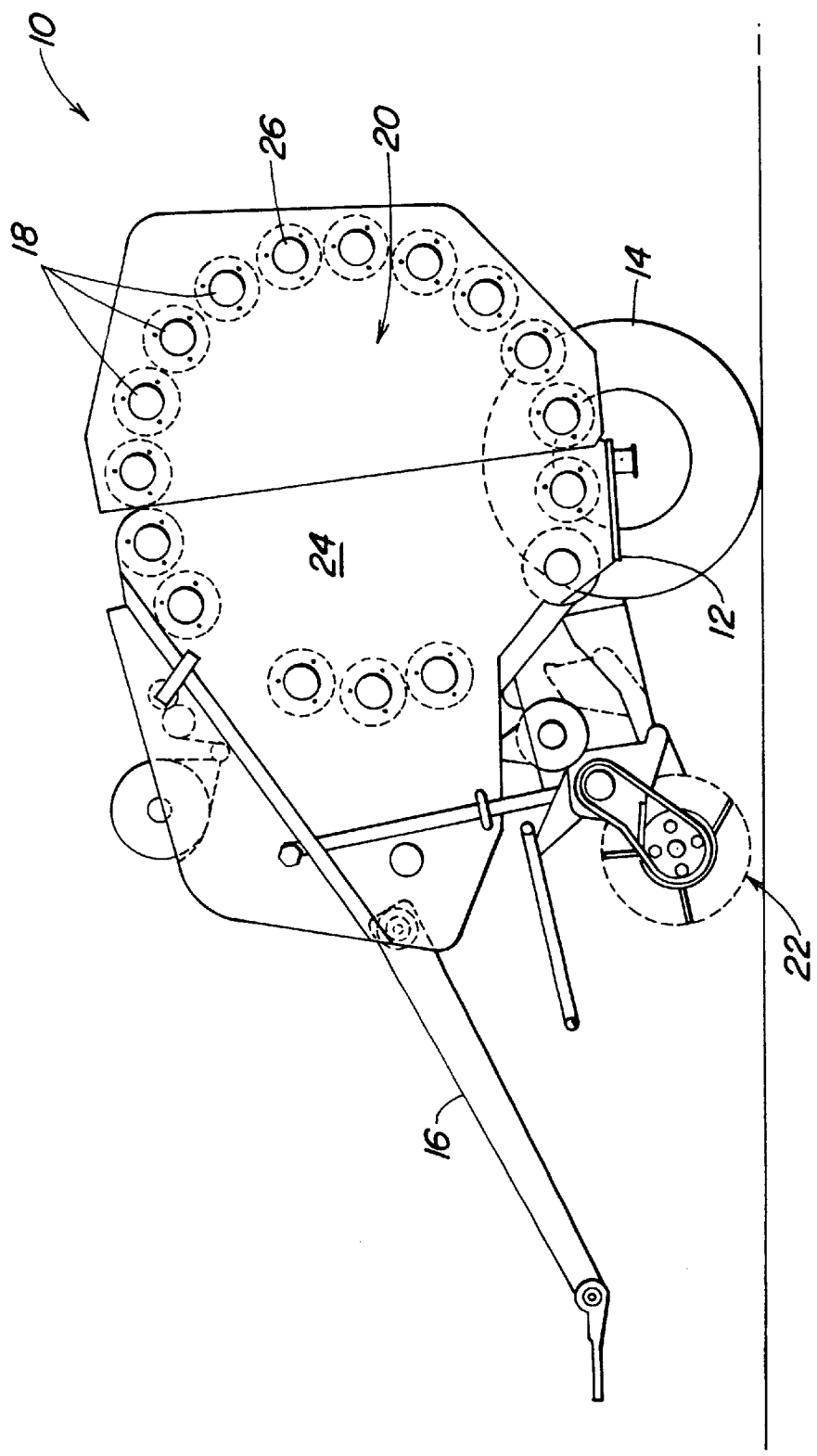
FIG. 1 is a schematic left side elevational view of a large round baler of the type with which rolls constructed in accordance with the present invention are particularly adapted for use.

The harvester 10 shown in FIG. 1 has a frame 12 that is supported on the ground by wheels 14 and is coupled to a tractor (not shown) by a hitch 16. The harvester 10 is in the form of a large round baler with the frame 12 including opposite side walls 24, with each side wall being provided with a plurality of openings 26 respectively axially aligned with like openings in the opposite wall. The openings 26 are arranged in a near circular pattern and located in each set of aligned openings 26 is a roll 18, the rolls 18 being rotationally supported by the side walls by bearings that are not shown. Depending on the respective design, the rolls 18 are either freely rotatable or driven and they cooperate with the side walls 24 to define a baling chamber 20 of fixed size. It is noted however that the harvester 10 may also be in the form of a large round baler having a baling chamber of variable size, as is well known. In any event, during operation, the baling chamber 20 is continuously charged with crop products by the operation of a pick-up device 22 which conveys a windrow of such crop products through a crop inlet leading to the chamber.

Figure 2:
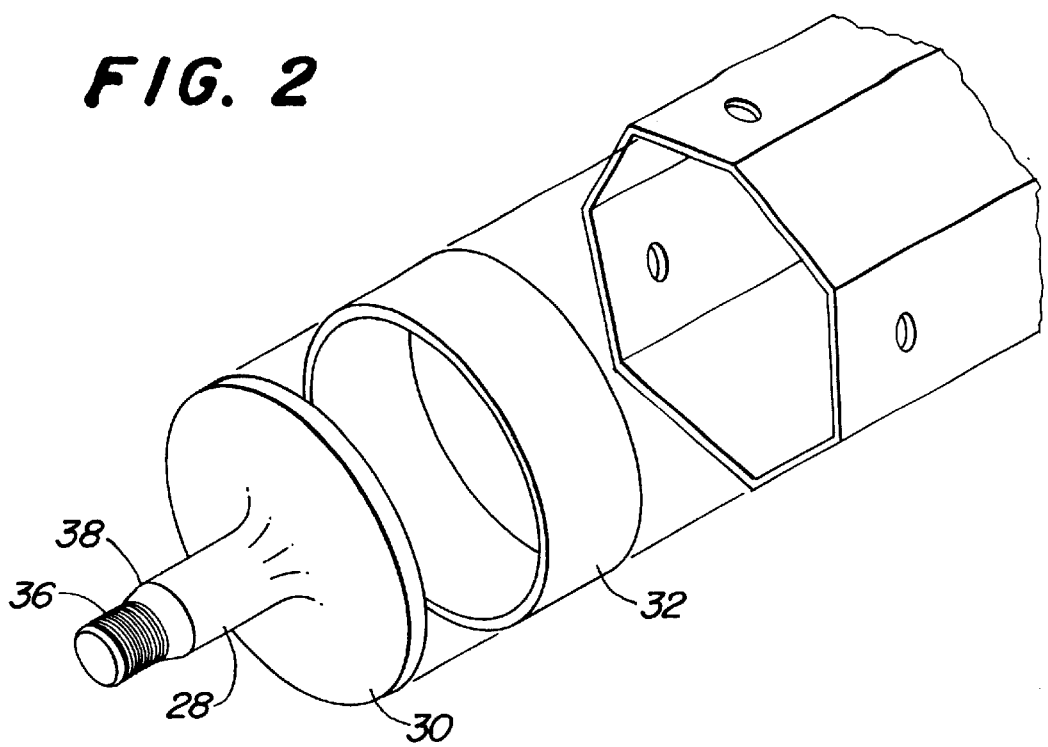
FIG. 2 is an exploded perspective view of an end of a roll constructed in accordance with a first embodiment of the invention.
Figure 3:
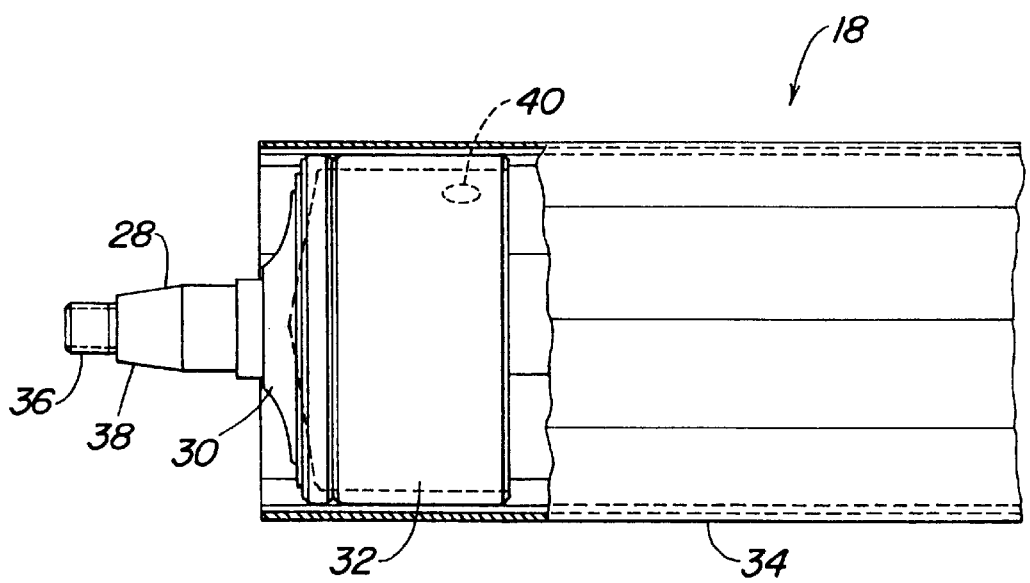
FIG. 3 is an elevational view, with parts broken away, showing the stub shaft assembly of FIG. 2 installed in the end of the roll tubular central body.

Referring now to FIGS. 2 and 3, it can be seen that each roll 18, is composed of a stub shaft 28, a flange 30 and a tubular cylindrical extension 32 secured to each end of a multisided tubular central body 34. It is to be understood that while only one end of the roll 18 is shown the opposite end its of a similar construction. Further, it is to be noted that the central body 34 could also be a smooth walled cylinder if desired.

The stub shaft 28 is provided with a threaded end 36 and an adjacent cone 38. The threaded end and the cone serve for holding a drive sprocket (not shown) in rotationally rigid fashion. The stub shaft 28 extends coaxial with and outwardly from the tube 34.

The flange 30 is essentially in the form of a radially extending disk, the outside diameter of which corresponds, without regard to tolerances, to that of a circle which is tangent to the flat sides of the tubular body 34. The shaft 28 transforms into the flange 30 due to its continuously increasing diameter and forms an integral unit that consists of weldable material together with the flange. However, it would also be conceivable to connect the shaft 28 to the flange 30 in separable fashion, e.g., to screw the shaft into the flange 30 or fasten the shaft in the flange by other means.

The tubular extension 32 has a simple cylindrical shape and an outside diameter that corresponds to the outside diameter of the flange 30. The extension 32 consists of a metal that can be welded to the metal of the flange 30. The thickness and the length of the extension 32 are chosen such that the extension is able to absorb the peak loads acting upon the tubular central body 34 as well as the bending moments and, if applicable, torsional moments acting upon the extension, without causing damage. In one practical example, the extension 32 has a length of 110 mm, a thickness of 10 mm, and an outside diameter of 200 mm. A extension of this length is used with a body 34 having a length of approximately eleven to fifteen times the length of the extension 32. The outside diameter of the extension 32 is chosen such that the extension is held in the body 34 without play. In fact, if the extension 32 is fitted to the inside of the body 34 with sufficient accuracy, no additional connections between the extension and the body are required. In order for the fit to be sufficiently tight, the extension may be shrunk, that is to say, press fit into the body 34. The body 34, as shown here, has seven uniformly distributed sides. The extension 32 shown has a round cross section, but it is not necessary for the entire outer surface of the extension to come in contact with the inner surface of the body 34. In this respect it suffices if only the inner edges or surfaces that form the inner circumference of the multisided body 34 come in contact with the extension. The remaining torsional and bending forces are absorbed by the rotationally rigid connection between the flange 30 and the body 34. However, it is to be understood that the extension 32 may also be shaped to any inside profile of the body 34. The body 34 is preferably manufactured from steel and, if so required, may be welded to the extension 32 and/or the flange 30. In order to produce a welding connection, a series of holes 40 that are uniformly distributed over the circumference are provided in the outer end portions of the body 34, namely within the region in which it overlaps the extension 32. The circular walls of these holes can be welded to the extension 32.

The assembly of the roll 18 is described with reference to FIG. 3. Specifically, the flange 30 and the extension 32 are welded together and form a pot-like unit with a uniform outside diameter. Since the stub shaft 28 is also connected to the flange 30 in a rotationally rigid fashion, a rotary unit results which is inserted into the interior of the body 34 and connected thereto in a rotationally rigid fashion, e.g., by means of welding. FIG. 3 shows that the flange 30 is spaced inwardly from the end face of the body 34 by a slight distance of approximately 30–40 mm. However this is by no means imperative.

Figure 4:
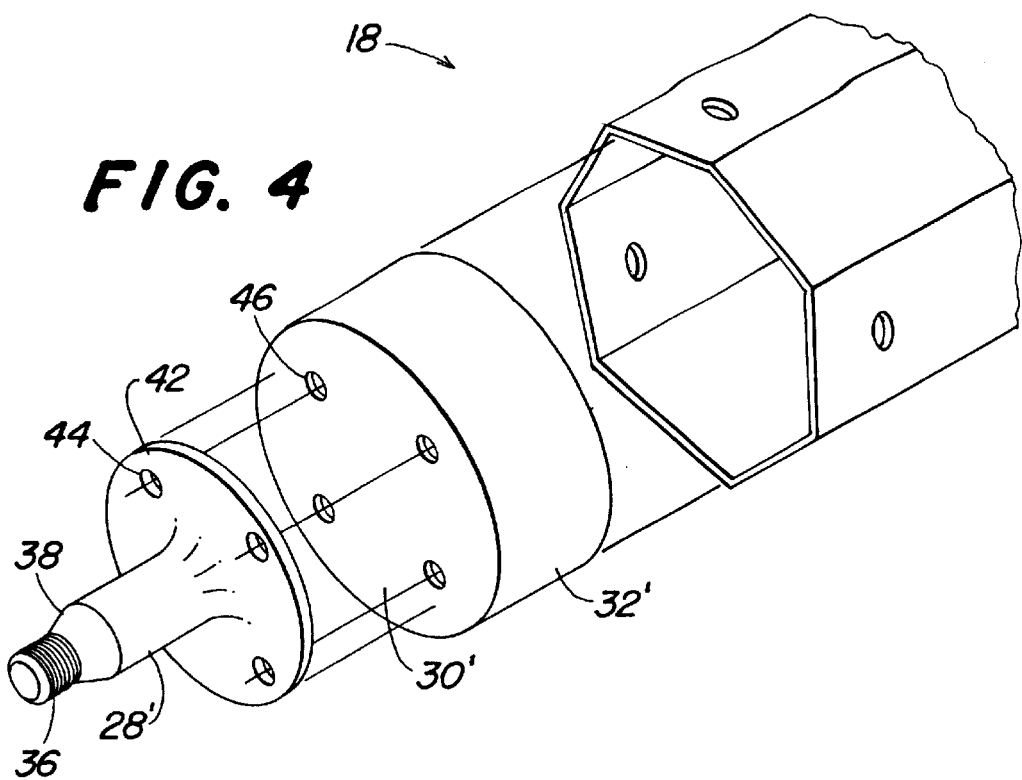
FIG. 4 is an exploded perspective view of an end of a roll constructed in accordance with a second embodiment of the invention.
Figure 5:
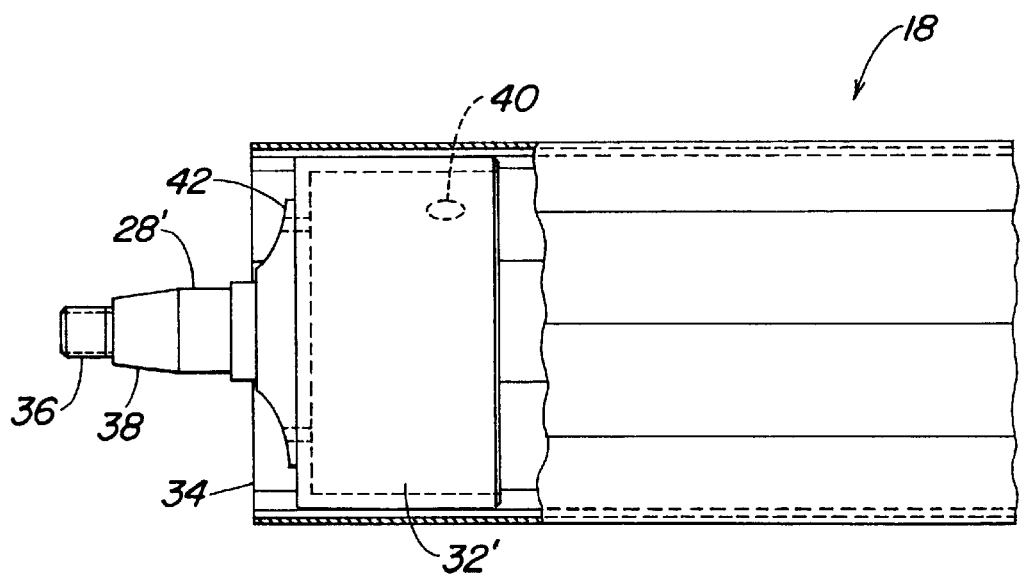
FIG. 5 is an elevational view, with parts broken away, showing the stub shaft assembly of FIG. 4 installed in an end of the roll tubular central body.

Referring now to FIGS. 4 and 5, there is shown a second embodiment of the roll 18. Specifically, in this embodiment, a stub shaft 28' includes the threaded end 36 and the cone 38, however, the shaft 28' ends in a flange 42 which is smaller in diameter than the flange 30 of the first embodiment although it could be made the same size. The flange 42 is intended to be bolted and for that purpose contains a plurality of bolt holes 44.

For use with the flange 42, the tubular extension 32 is replaced by a tubular sleeve 32' which is integral with a flange 30' that is provided with a set of threaded bores 46 arranged in the same pattern as the holes 44 in the flange 42 so that the flanges 30' and 42 may be fixed together with bolts (not shown). The extension 32' and the flange 30' may be cast together. The dimensions of the extension 32' correspond to those of the extension 32 shown in FIGS. 2 and 3, wherein the extension can, if so required, be welded to the tubular central body 34 within the region of the holes 40. Thus, the stub shaft 28' with the flange 42 forms a rotationally symmetrical part when assembled with the flange 30' and the extension 32'. This rotationally symmetrical part can be concentrically inserted into the tube 34 and fixed therein.

In contrast to the previous description, the flange 30' may also be welded to the extension 32' and subsequently bolted to the second flange 42. In any event, the flange 30 of the first embodiment, and the flanges 42 and 30' of the second embodiment constitute respective connecting structures joining the stub shafts 28 or 28' to the tubular extensions 32 or 32'.

What is claimed is:

1. In a baler roll including a central tubular body having a pair of shafts secured to and respectively projecting axially from opposite ends thereof, the improvement comprising: a pair of separate tubular extensions respectively located solely within opposite end portions of said tubular body; each tubular extension being permanently engaged with and directly rigidly fixed to an inner surface portion of an associated one of said opposite end portions of said tubular body; and a connecting structure in the form of a circular flange structure joining each stub shaft to an outer end of a respective one of said pair of separate tubular extensions and being located entirely within and welded to said associated one of said opposite end portions of said tubular body.

2. The baler roll defined in claim 1 wherein said circular flange structure is first and second circular flanges with said first flange being formed integrally with a respective one of said stub shafts and with said second flange being formed integrally with a respective one of said tubular extensions.

3. The baler roll defined in claim 2 wherein each first flange is provided with a first set of bolt holes; and each second flange is provided with a second set of bolt holes arranged identically to said first set of bolt holes, whereby said first flanges may be respectively bolted to said second flanges.

4. The baler roll defined in claim 1 wherein said central tubular body is provided with a plurality of evenly distributed holes in opposite end portions having said tubular extensions respectively located therein; and said central tubular body being welded to said extensions at said holes.

5. The baler roll defined in claim 1 wherein said central tubular body has a length between eleven and fifteen times that of each tubular extension.

6. The baler roll defined in claim 1 wherein said tubular extensions are respectively press fit in the opposite ends of said central tubular body.

7. The baler roll defined in claim 1 wherein said tubular extensions each have a length located in said central tubular body which results in said body being able to withstand bending forces expected to result in excessive bending of the body in the absence of said tubular extensions.

* * * * *